United States Patent
Nakanishi

(10) Patent No.: US 7,584,814 B2
(45) Date of Patent: Sep. 8, 2009

(54) MOTORCYCLE

(75) Inventor: Yutaka Nakanishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 515 days.

(21) Appl. No.: 11/451,365

(22) Filed: Jun. 13, 2006

(65) Prior Publication Data

US 2006/0283649 A1 Dec. 21, 2006

(30) Foreign Application Priority Data

Jun. 16, 2005 (JP) ............... 2005-176115

(51) Int. Cl.
*B62D 61/02* (2006.01)
(52) U.S. Cl. .................... 180/227; 180/284
(58) Field of Classification Search ............ 180/227, 180/284
See application file for complete search history.

(56) References Cited

U.S. PATENT DOCUMENTS

| 4,887,687 | A  | * | 12/1989 | Asai et al. .................. 180/219 |
| D521,419 | S  | * | 5/2006 | Mezzasalma .............. D12/117 |
| 2006/0151226 | A1 | * | 7/2006 | Misaki et al. .............. 180/227 |
| 2006/0278458 | A1 | * | 12/2006 | Toyoda ...................... 180/227 |
| 2007/0102218 | A1 | * | 5/2007 | Ishii ........................... 180/227 |
| 2007/0145227 | A1 | * | 6/2007 | Hasegawa ................. 248/637 |
| 2007/0210555 | A1 | * | 9/2007 | O'Connor .................. 280/284 |

FOREIGN PATENT DOCUMENTS

| EP | 1 642 819 A1 | 4/2006 |
| JP | 2002-87364 A | 3/2002 |

* cited by examiner

*Primary Examiner*—Lesley D Morris
*Assistant Examiner*—Tashiana Adams
(74) *Attorney, Agent, or Firm*—Birch, Stewart, Kolasch & Birch, LLP

(57) ABSTRACT

A front end portion of a rear swing arm of a motorcycle is pivoted to a vehicle body frame via a rear swing-arm bracket. A rear wheel is rotatably supported by a rear end portion of the rear swing arm. The rear swing arm is provided with a shaft drive mechanism for driving the rear wheel. The rear swing-arm bracket includes a left/right pair of frame members, cross members and a connection portion. A front end portion of the shaft drive mechanism faces a right-side opening at a position biased towards the frame member. The connection portion is extendedly provided at a position biased toward the center line (the center) extending along the longitudinal direction of the vehicle. The front end portion of the rear swing arm is fastened to the frame member and the connection portion via a pivot shaft and a nut in a left-side opening.

11 Claims, 8 Drawing Sheets

MOTORCYCLE

CROSS-REFERENCE TO RELATED APPLICATIONS

The present application claims priority under 35 USC 119 to Japanese Patent Application No. 2005-176115 filed on Jun. 16, 2005 the entire contents of which are hereby incorporated by reference.

FIELD OF THE INVENTION

The present invention relates to a motorcycle in which a rear wheel is driven by a shaft drive mechanism. More specifically, to a motorcycle provided with a rear swing-arm bracket for pivotally supporting a front end portion of a rear swing arm via a pivot shaft, the rear swing arm rotatably supporting the rear wheel.

DESCRIPTION OF BACKGROUND ART

Motorcycles are known which operate by driving a rear wheel of the motorcycle via a shaft drive mechanism. Japanese Patent Laid-Open No. 2002-87364 discloses a motorcycle including a rear swing arm supporting a rear wheel. The rear swing arm is pivotally supported by left/right rear swing-arm brackets via the brackets and a pivot shaft, and is supported by a rear-wheel suspension. The rear wheel is driven by a shaft drive mechanism.

With regard to the bracket, cross members are provided so as to extend between upper portions of left/right frame members, and between lower portions thereof. An opening which opens in the fore-and-aft direction, and a concave portion a side of which is opened are provided by the frame members and the upper/lower cross members. A front end portion of the rear swing arm which is disposed in the opening is swingably coupled to the frame members via the pivot shaft. A universal joint portion of the shaft drive mechanism is disposed in the concave portion. In addition, a shock absorber is provided as part of the rear-wheel suspension and is attached between an upper connection portion (the upper cross member) of the bracket and a link attached to a lower connection portion (the lower cross member) of the bracket.

In the prior art, when the rear-wheel suspension system is assembled, the rear swing arm is bolt-fastened via the pivot shaft, and is disposed in the opening. Thereafter, the universal joint portion of a drive shaft is disposed in the concave portion opening to a side, and is coupled to an output shaft on the engine side. Finally, footrest brackets are disposed so as to laterally cover the rear swing-arm bracket by using fastenings, whereby the rear-wheel suspension system is assembled.

However, in the rear swing-arm bracket of the above motorcycle, the shaft drive mechanism is sub-assembled integrally with the rear swing arm. In the assembling process, when the rear swing arm is temporarily mounted to the rear swing-arm bracket, since a connection portion is provided between the upper cross member and the lower cross member is disposed at a position extremely biased from the center line extending along the longitudinal direction of the vehicle toward the shaft drive mechanism side, the portion of the pivot shaft near an end thereof is disposed at a position close to the shaft drive, the pivot shaft passing through a through hole in the connection portion.

In this way, a space between an end of the pivot shaft and the shaft drive mechanism is small. Thus, the space used for inserting a fastening tool, such as a torque wrench or the like, for tightening a fastening, such as a nut or the like, on the pivot shaft is scarce. For this reason, it has been difficult to insert a fastening tool into the space between the shaft drive mechanism and the connection portion to perform the work of tightening the pivot shaft via a fastening, such as a nut.

It is conceivable that, in order to avoid such a situation, an internal thread into which an external thread formed at an end of the pivot shaft is screwed is previously formed in the connection portion by a screw cutting process as disclosed in Japanese Patent Laid-Open No. 2002-87364. In this case, however, there is a problem wherein the number of steps required to manufacture the rear swing-arm bracket increases.

SUMMARY AND OBJECTS OF THE INVENTION

It is an object of an embodiment of the present invention to provide a motorcycle that makes it possible to reduce the number of manufacturing steps of the rear swing-arm bracket.

For the purpose of achieving the above object, a first aspect of an embodiment of the present invention is to provide a motorcycle in which a front end portion of a rear swing arm is pivoted to a rear swing-arm bracket via a pivot shaft. A rear wheel, rotatably supported by a rear end portion of the rear swing arm, is driven by a shaft drive mechanism. The rear swing arm is supported by a rear-wheel suspension wherein the rear swing-arm bracket is formed of a left/right pair of frame members with upper/lower cross members being provided so as to extend between upper portions of the frame members and between lower portions thereof, respectively. A connection portion is provided so as to extend between the upper/lower cross members and forming openings in parallel on the left/right sides by partitioning. A front end portion of the shaft drive mechanism and a front end portion of the rear swing arm are allowed to face one opening and the other opening, respectively. The connection portion is provided with a through hole into which the pivot shaft is inserted with the connection portion being disposed within an area such that it overlaps a center line of a vehicle with respect to a vehicle width direction and additionally is disposed at a position biased toward the frame member forming the opening which the front end portion of the shaft drive mechanism faces.

A second aspect of an embodiment of the present invention includes the connection portion having a concave portion around the through hole on the one side of the openings which faces the front end portion of the rear swing arm faces, and part of the front end portion of the rear swing arm is located in the concave portion.

A third aspect of an embodiment of the present invention includes the connection portion being provided with an attachment bracket portion to which an upper end of the rear-wheel suspension is attached.

A fourth aspect of an embodiment of the present invention includes the attachment bracket portion being provided between the upper cross member and the through hole with respect to an up/down direction of the vehicle.

A fifth aspect of an embodiment of the present invention includes the attachment bracket portion being disposed obliquely above and more rearward than the through hole, and obliquely below and more rearward than the upper cross member.

A sixth aspect of an embodiment of the present invention includes the upper cross member being provided so as to extend between the upper portions of the left/right pair of frame members and being formed in a triangle shape in section having an inclined face downward toward the rear.

With the present invention, if a configuration is adopted in which the connection portion is provided with the concave portion, and in which the front end portion of the rear swing arm and the concave portion are disposed so that they partly overlap each other in the vehicle width direction, the position at which the connection portion to be provided can be set at a position biased toward the center with respect to the vehicle-body width direction to the utmost extent, while keeping the length of the pivot shaft of the rear swing arm long. Thus, it is possible to secure a sufficient space, into which the tool for fastening bolts, nuts and the like is inserted to perform the work, between an end of the pivot shaft pivotally supporting the rear swing arm and the shaft drive mechanism. Accordingly, it is possible to perform fastening work with the fastening tool inserted. As a result, it is possible to eliminate the step of cutting a thread in the frame member of the rear swing-arm bracket, into which thread the pivot shaft is screwed, so that it is made possible to reduce the number of manufacturing steps.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
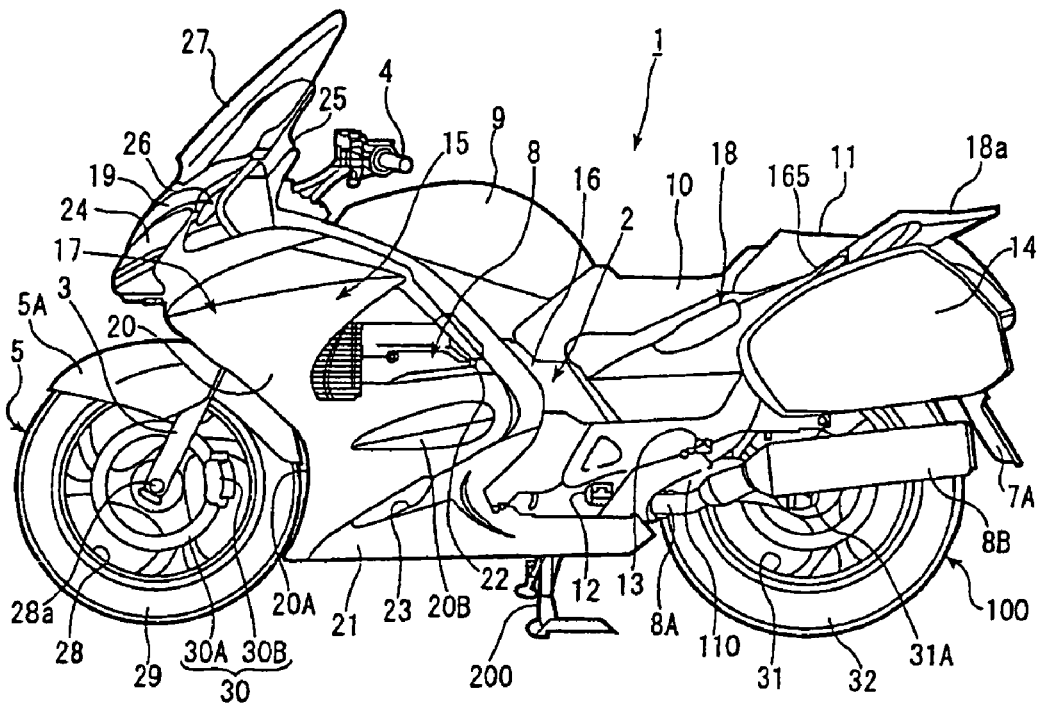
FIG. 1 is a side view of an embodiment of a motorcycle according to the present invention.
Figure 2:
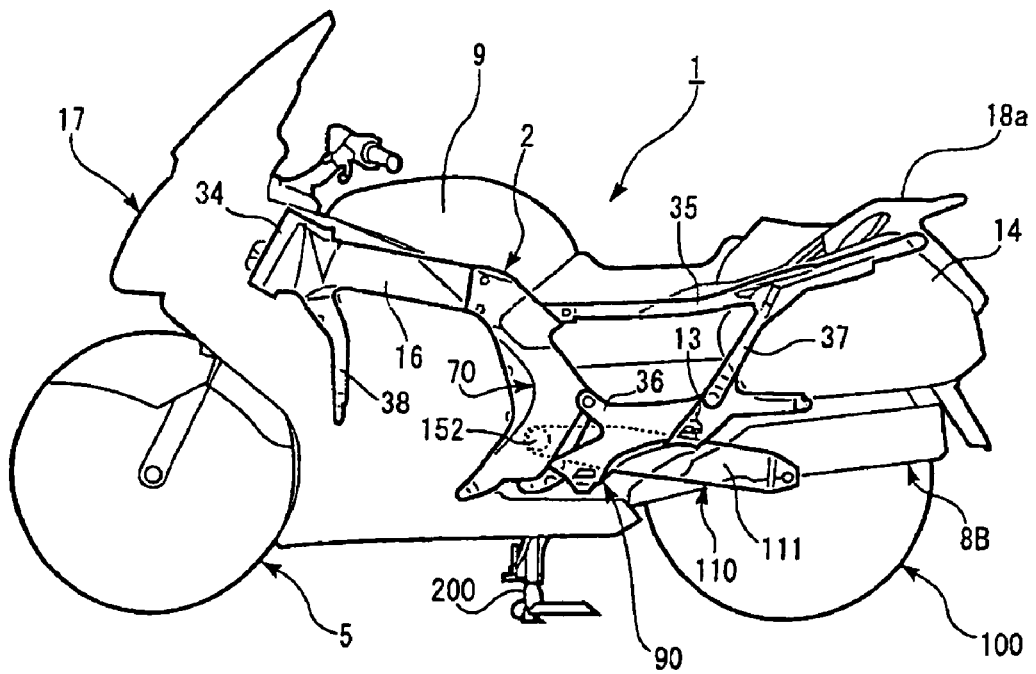
FIG. 2 is a side view of a vehicle body frame of the motorcycle according to the embodiment.

A detailed description will be given below of an embodiment of the present invention with reference to the drawings. FIG. 1 is an overall schematic side view illustrating a motorcycle 1 provided with a rear swing-arm attachment structure of the embodiment according to the present invention. FIG. 2 is a side view of a frame of the motorcycle 1 viewed from a side. FIG. 1 illustrates a state in which the motorcycle 1 is supported by a stand 200. The description below will first provide an outline of the construction of the motorcycle.

As shown in FIG. 1, the motorcycle 1 includes a vehicle body frame 2, a left/right pair of front forks 3 pivotally supported by a front end portion of the vehicle body frame 2, a steering handlebar 4 attached to an upper end portion of the front forks 3, a front wheel 5 rotatably supported by the front forks 3, a rear swing arm (also referred to as "the swing arm") 110 swingably supported by the vehicle body frame 2 with a rear wheel 7 rotatably supported by rear end portions of the rear swing arm 110. An engine 8 is supported by the vehicle body frame 2 with a fuel tank 9 disposed above the vehicle body frame 2 and a driver's seat 10 being provided to the rear of the fuel tank 9. A passenger's seat 11 is provided to the rear of the driver's seat 10. Driver's footrests 12 and passenger's footrests 13 are provided together with side trunks 14 attached to rear portions of the vehicle body on the left and right sides thereof. A cowl 15 is provided for covering almost the entire vehicle body.

Exhaust pipes 8A are connected to cylinders of the engine 8. The exhaust pipes 8A extend downwardly, bend below the engine 8, and are connected to a muffler 8B disposed to the rear thereof.

The cowl 15 includes a front cowl 17 covering a front portion of the vehicle body, and a rear cowl 18 covering a rear portion of the vehicle body that is a portion under the seats 10, 11. The front cowl 17 includes an upper cowl 19 provided to a front end portion of the vehicle body, middle cowls 20 covering side portions of the engine 8 and an under cowl 21 covering a portion bellow lower portion of the engine 8 (a portion below lower portions of the exhaust pipes 8A).

In the front cowl 17, first openings 22 are formed in center portions thereof with respect to the height direction, and second openings 23 are formed in lower portions thereof. An air flow, that is caused by the wind during motion of the vehicle, goes in and out between the inside and the outside of the cowl through the first openings 22 and the second openings 23. A cylinder head for covering the engine 8 is exposed from the first openings 22. An wind intake port 20A to permit an air flow caused by traveling into the cowl is provided in a front portion of the middle cowl 20 of the cowl 15. Projecting panels 20B each projecting to the outside of the vehicle body are provided in lower portions of the middle cowls 20 on the left and right sides.

A meter unit (not shown) in which a speedometer, an engine tachometer and others are installed is arranged inside the upper cowl 19. Headlights 24 are provided in a front face of the upper cowl 19 with back mirror covers 25 being provided in such a way that they project on both sides of the upper cowl 19. A back mirror is provided in the back mirror cover 25 with a turn signal lamp 26 being provided in a front face of each of the back mirror covers 25. A wind screen 27 for a front view, which is made of transparent synthetic resin, is provided in an upper portion of the upper cowl 19.

The rear cowl 18 is formed in such a way that it extends rearwardly from areas below the seats 10, 11. In a rear portion thereof, the rear cowl 18 integrally includes a tail portion 18a covering a rear portion of the seat 11. A rear fender 7A covering an upper rear portion of the rear wheel 7 is attached to a rear end portion of the rear cowl 18.

The front wheel 5 is constructed by installing a tire 29 on the outer periphery of a wheel 28 having an axle 28a provided at its center. Both left and right side ends of the axle 28a are supported by lower end portions of the front forks 3. A front fender 5A for covering the front wheel 5 from above is attached to the left and right front forks 3. Rotors 30A each constituting a front disk brake 30 are fixed to the wheel 28 of the front wheel 5 on both left and right sides thereof coaxially and integrally with the wheel 28. The front disk brake 30 has the rotor 30A, and a brake caliper 30B that, in an operating state, squeezes the rotor 30A to brake the rotation thereof by using a frictional force.

As in the case of the front wheel 5, the rear wheel 7 includes a wheel 31 having an axle 31A provided at the center and a tire 32 installed on the outer periphery of the wheel 31. The rear wheel 7 is also equipped with a rear disk brake including a rotor and a brake caliper similar to the front disk brake 30 of the front wheel 5. A description thereof is omitted herein.

As shown in FIG. 2, the vehicle body frame 2 includes a head pipe 34 provided in a front end portion, a left/right pair of main frames 16 extending obliquely rearwardly and downwardly from the head pipe 34 and seat frames (first frames) 35 extending from upper portions of the main frames 16 toward the rear of the vehicle body. Footrest plates (second frames) 36 extend from lower portions of the main frames 16 toward the rear of the vehicle body. Rear frames (third frames) 37 are provided with each being coupled to a rear portion of the seat frame 35 and a rear portion of the footrest plate 36 on the rear side of the vehicle body. A rear swing-arm bracket 70 is joined to rear portions of the main frames 16.

The head pipe 34 steerably supports the front forks 3 supporting the front wheel 5. The head pipe 34 has a forwardly extending stay attached thereto, which supports the meter unit of the speedometer, the engine tachometer and others. In addition, a bracket (not shown) is coupled to the stay attached to the head pipe 34, which supports the front cowl 17.

Figure 3:
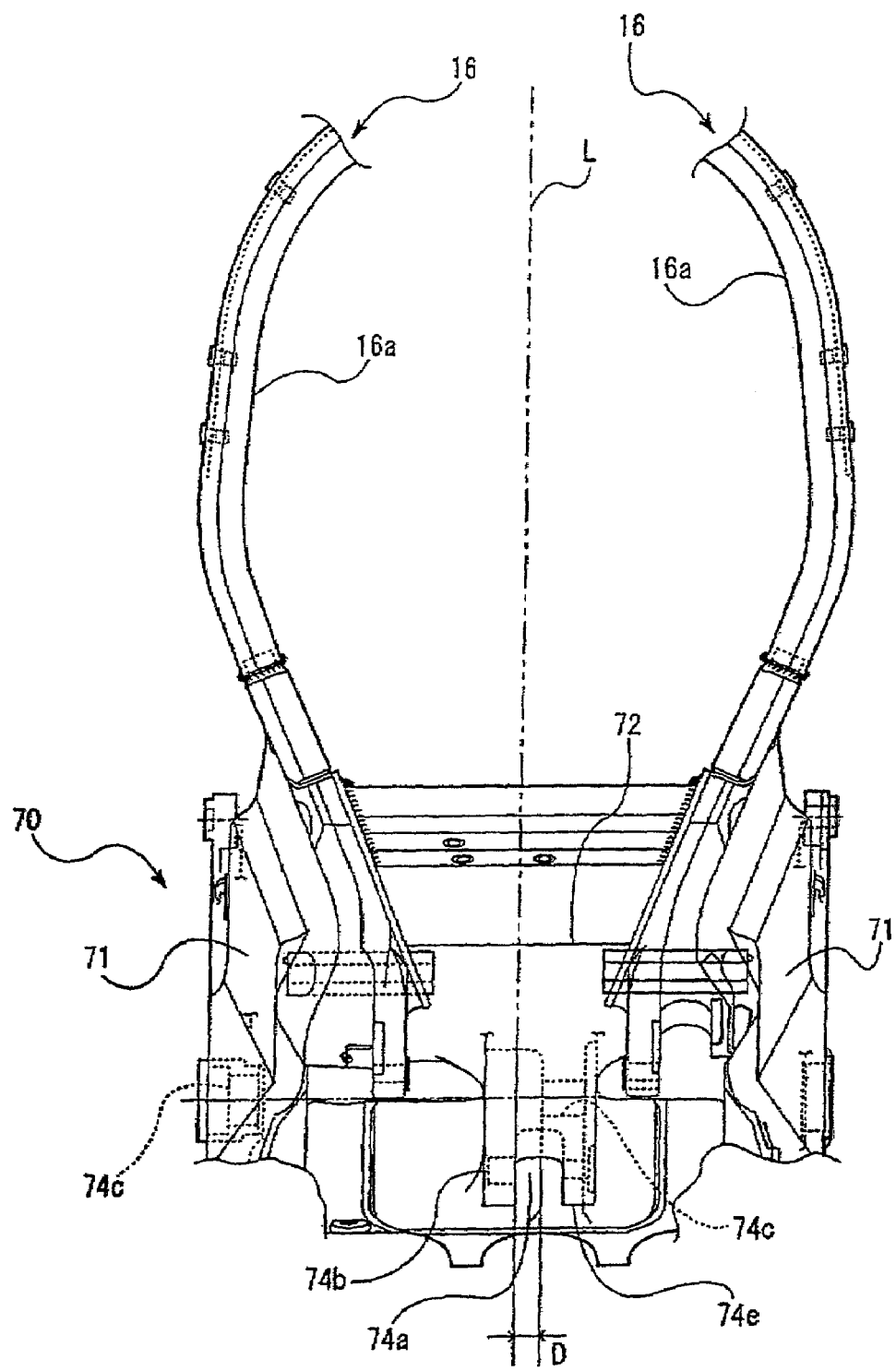
FIG. 3 is a plan view of the vehicle body frame.

As shown in FIG. 3, the main frames 16 are vehicle-body constituting members forming a base of the vehicle body, and are formed of a left/right pair of main frame parts 16a curving so as to gently project outward. The main frame 16 includes a member with a hollow angular section made of metal such as aluminum. The main frames 16 support the fuel tank 9 on upper portions thereof. Engine hangers 38 are formed so as to extend downwardly from between the head pipe 34 and the main frames 16 of the vehicle body frame 2. The main frames 16 support the engine 8 via the engine hangers 38.

The rear swing-arm bracket 70 to be described later in detail is connected to rear end portions of the main frames 16 by welding.

A left/right pair of the seat frame 35 is provided so as to extend rearwardly from the upper portions of the left/right pair of main frames 16. The left/right/pair of seat frames 35 support the driver's seat 10 and the passenger's seat 11 and extend to the vicinity of a tail portion 18a to be integrated with each other on the rear end side. As in the case of the main frame 16, the seat frame 35 includes a member with a hollow angular section made of metal such as aluminum.

The footrest plates 36 are provided as a left/right pair so as to extend rearward from the lower portions of the left/right pair of main frames 16. The driver's footrests 12 are provided on outer front portions of the footrest plates 36. The passenger's footrests 13 are provided below the rear frames 37. In other word, the footrest plates 36 and the rear frames 37 which are made of rigid members serve as footrest holders. As in the case of the main frame 16, the footrest plate 36 includes a member with a hollow angular section made of metal such as aluminum.

Figure 5:
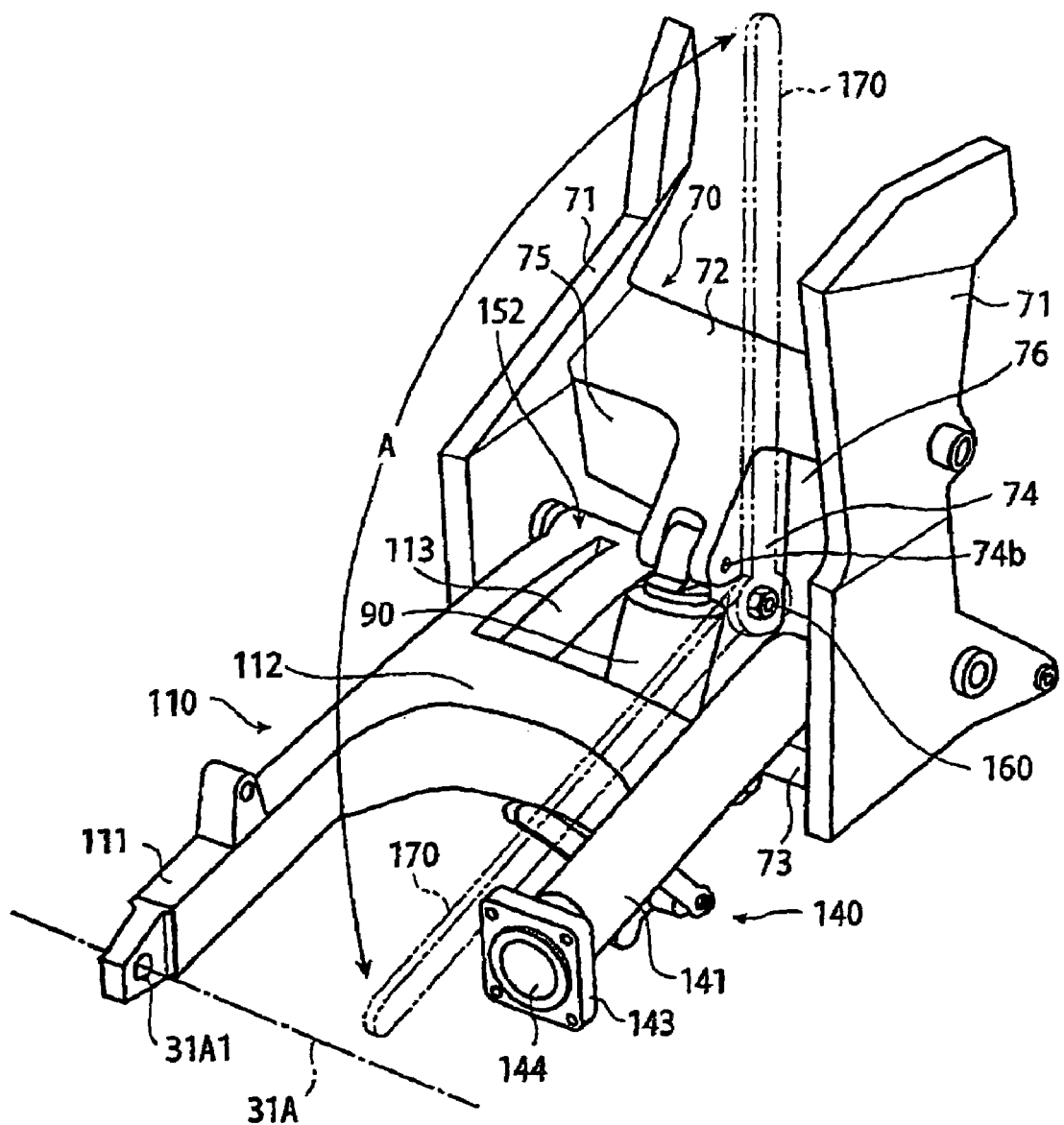
FIG. 5 is an external perspective view of a rear-wheel suspension system in which a rear swing arm is mounted to the rear swing-arm bracket shown in FIG. 4.
Figure 6:
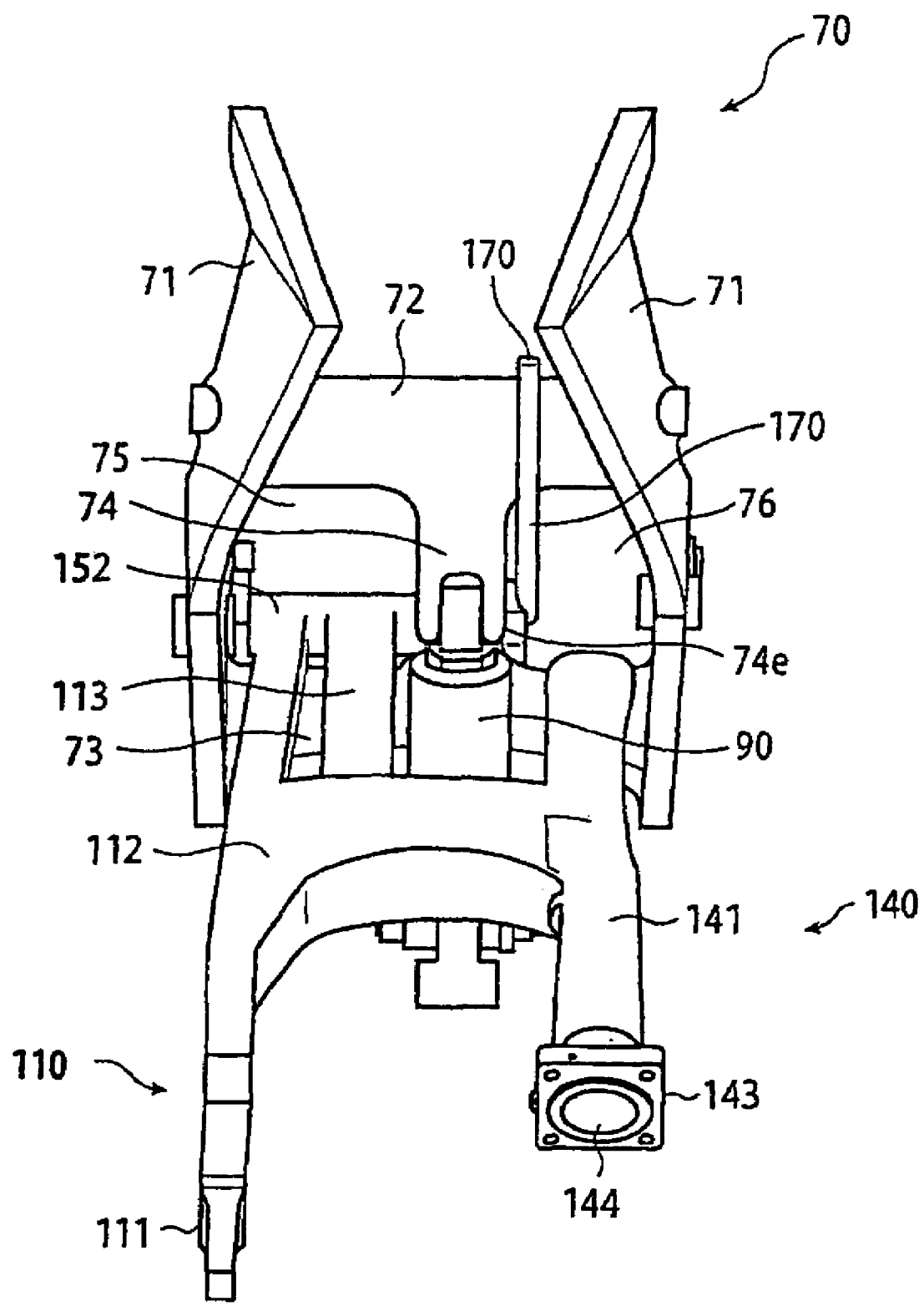
FIG. 6 is an external view of the rear-wheel suspension system shown in FIG. 5 viewed from the back.

The rear swing-arm bracket 70 (detail construction of the rear swing-arm bracket 70 will be described later in detail) that is freely swingably supporting the rear swing arm 110 is disposed to the front of the footrest plates 36, and the footrest plates 36 are joined thereto. As shown in FIGS. 5 and 6, the rear swing arm 110, at its front end, is attached to the rear swing-arm bracket 70 via a pivot portion 152, and extends rearwardly from the pivot portion 152. The pivot portion 152 is pivotally supported at a point more forward than the step plates 36. Thus, the rear swing arm 110 swings in up and down directions about the pivot portion 152, more specifically, a pivot shaft 150 (see FIG. 4).

The rear frames 37 are provided as a left/right pair, upper ends of which are connected to substantially center portions of the seat frames 35 with respect to the fore-and-aft direction, and lower ends of which are connected to rear portions of the footrest plates 36. The rear frame 37 includes a member with a hollow angular section made of metal such as aluminum.

The vehicle body frame 2 is set so that a shape of the space created by the rear swing-arm bracket 70 joined to the rear portions of the main frame 16 with the seat frames 35, the footrest plates 36, and the rear frames 37 becoming a rectangular shape when viewed from the side. More specifically, the side view shape of the space is a trapezoidal shape in which the bottom length (the footrest plate 36 side) is shorter than the upper base length (the seat frame 35 side). Each of the main frames 16, the rear swing-arm bracket 70, the seat frames 35, the footrest plates 36, and the rear frames 37, which are coupled together, functions as a reinforcement member which maintains the strength of the vehicle body as a whole.

Since the vehicle body frame 2 includes the main frames 16, the rear swing-arm bracket 70 joined to the main frames 16, the seat frames 35 and the footrest plates 36 extending rearwardly from the upper portions and the lower portions of the main frames 16, respectively, and the rear frames 37 each connecting the seat frame 35 and the footrest plate 36, and is set so that the side view shape of the space created by these frames becomes a substantially rectangular shape, a high rigidity can be obtained without having to use another reinforcement member. In addition, since another reinforcement member is not required, and the total number of members is reduced, it is possible to achieve reduction in cost, and to effectively use the space inside the frame.

The rear wheel 100 is supported by a rear-wheel suspension system shown in FIGS. 5 and 6. The rear-wheel suspension system includes the rear swing-arm bracket 70, the rear swing arm 110 having the pivot portion 152 swingably pivoted to the rear swing-arm bracket 70 and a shock absorber (hereinafter referred to as "the rear-wheel suspension") 90 and the like, which are interposed between the rear swing arm 110 and the rear swing-arm bracket 70 used as a cushion for absorbing vibration caused by travel while the vehicle is being operated. Description will be given below of the rear swing-arm bracket 70, and the rear swing arm 110 pivoted thereto in this order.

Figure 4:
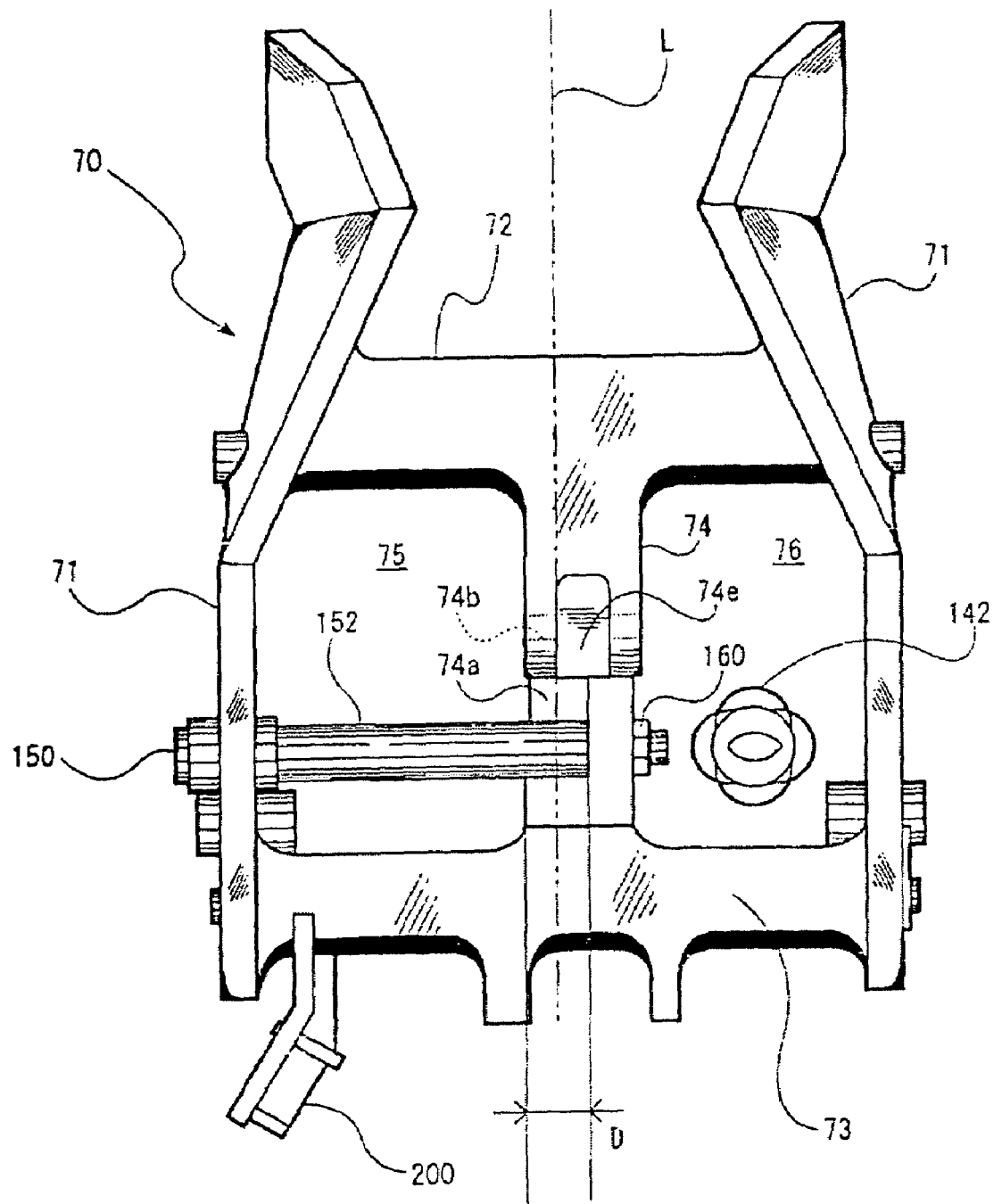
FIG. 4 is a back view of a rear swing-arm bracket in the embodiment viewed from the back.
Figure 7:
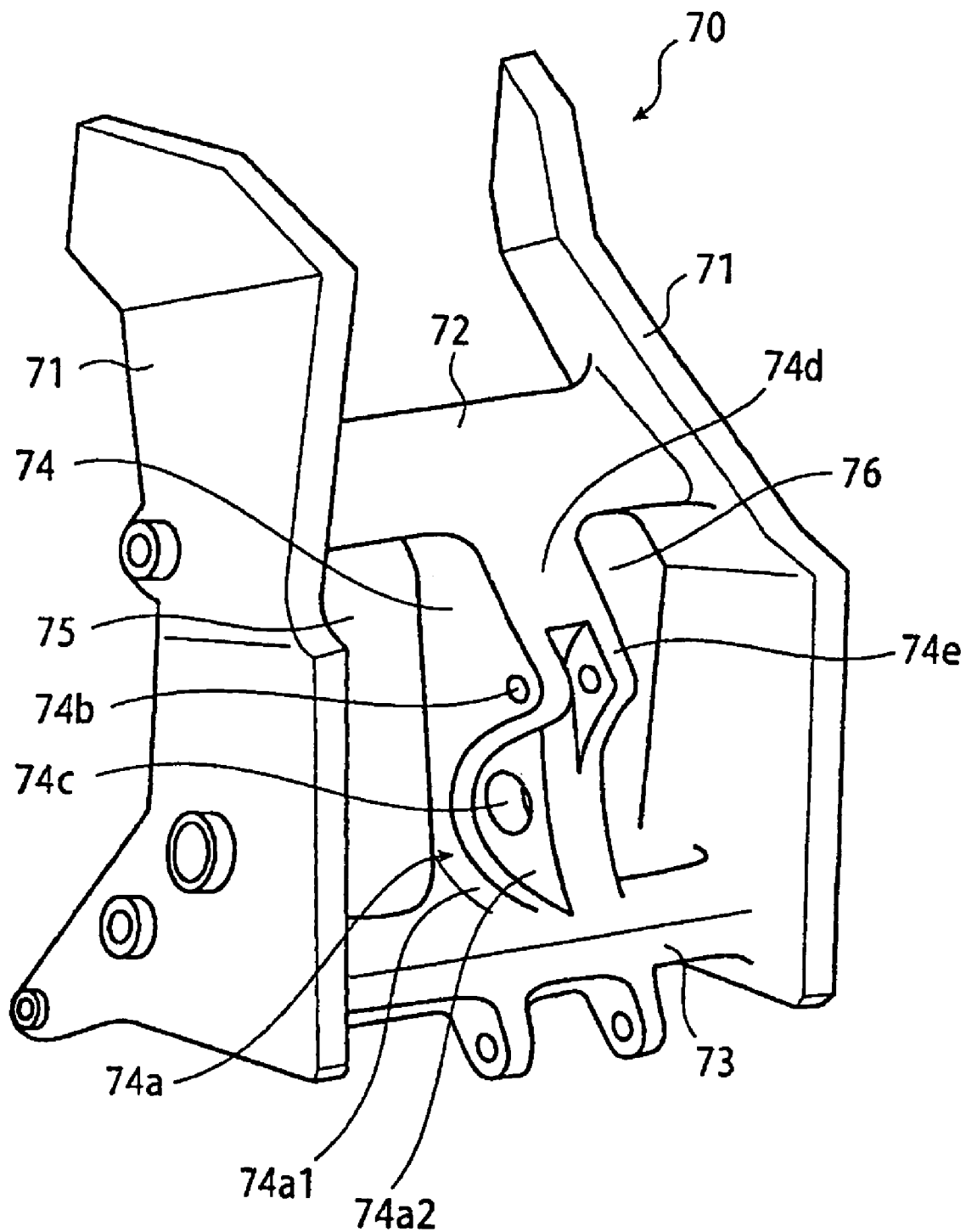
FIG. 7 is a left-side external view of the rear swing-arm bracket.

With reference to FIGS. 3, 4 and 7, description will be given of the rear swing-arm bracket 70, which is a component of the rear-wheel suspension system and is an essential component of the present invention. The rear swing-arm bracket 70 which is a component of the vehicle body frame 2 and to which the pivot portion 152 of the rear swing arm (the swing arm) 110 is attached is formed as part of the vehicle body frame 2 by joining left-side and right-side frame members 71 to rear end portions of the left/right pair of main frame parts 16a by welding (see FIG. 3). Thus, the vehicle body frame 2 that is integrated by using the main frames 16 and the rear swing-arm bracket 70 has a symmetrical shape with respect to a center line L extending along the longitudinal direction of the vehicle body.

The rear swing-arm bracket 70 includes: the left/right pair of frame members 71 oriented substantially in a longitudinal direction, an upper cross member 72 and a lower cross member 73 which are formed on the upper portion and the lower portion of the frame members 71, respectively and a connection portion 74 which joins the cross members 72 and 73. The upper cross member 72 is formed so that it has an inclined face formed in a triangle shape in section in a downward and rearward direction. With regard to the position at which the connection portion 74 is extendedly provided, the connection portion 74 is disposed in an offset manner at a position where the center of the connection portion 74 with respect to a vehicle width direction is slightly biased from the center line L extending along the longitudinal direction of the vehicle body toward the left-side frame member 71. In other words, the connection portion 74 has a positional relation such that the center line L of the rear swing-arm bracket with respect to the vehicle width direction (this center line L coincides with the center line extending along the longitudinal direction of the vehicle body) exists within the width dimension of the connection portion 74 in the vehicle width direction. In addition, the connection portion 74 is disposed so that the connection portion 74 is biased toward the right-side frame member 71.

Thus, on the left side of the connection portion 74, a left-side opening 75 is provided by the connection portion 74, the upper cross member 72, the left-side frame member 71, and the lower cross member 73. In addition, on the right side of the connection portion 74, a right-side opening 76 is provided by the connection portion 74, the upper cross member 72, the right-side frame member 71, and the lower cross member 73. As a result, the left-side opening 75 and the right-side opening 76 are arranged in parallel in a state where these openings open in the fore-and-aft directions of the vehicle body with the connection portion 74 interposed therebetween. The left-side opening 75 is opening larger than the right-side opening 76. In the left-side opening 75, the pivot portion 152 of the rear swing arm 110 is disposed, and, in the right-side opening 76, a yoke joint portion 142 of the shaft drive is disposed, for example (see FIG. 4). More specifically, the yoke joint portion 142 is disposed at a position biased toward the right-side frame member 71. The rear swing-arm bracket 70 is thus laid out so that the space between the joint portion 142 and the connection portion 74 becomes as large as possible. As a result, as shown in FIG. 5, it is made easy to insert a fastening tool 170, such as a torque wrench, for fastening a nut 160 on the pivot shaft 150 so that fastening work can be easily performed by swinging the handle of the tool within the range of the angle A.

Figure 8:
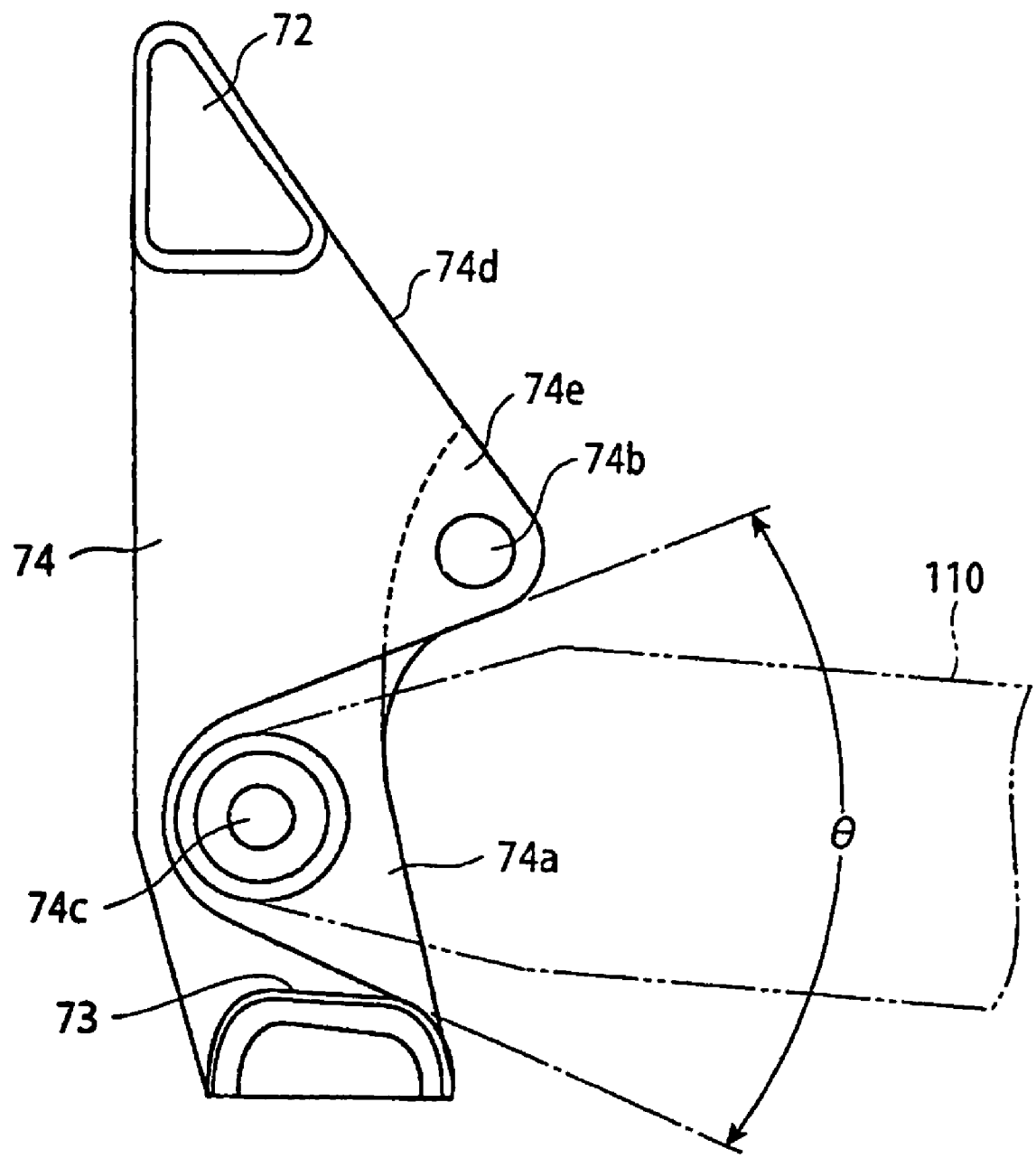
FIG. 8 is a partial longitudinal section of the rear swing-arm bracket.

A further description will be given of the rear swing-arm bracket 70. In a side face facing the left-side opening 75 of the left-side opening 75, a concave portion 74a is provided, as shown in FIGS. 4, 7 and 8. The concave portion 74a has a surrounding wall 74a1 and a bottom portion 74a2 around a through hole 74c into which the pivot shaft 150 made of a bolt is inserted. Thus, the concave portion 74a has a depressed structure. The depth of the surrounding wall 74a1 is set to have a dimension D that is substantially half of the dimension of the connection portion 74 in the vehicle width direction (see FIG. 4). If the depth dimension D, that is, the concave portion 74a is provided, a right-side end portion of the pivot portion 152 which is located at the front end of the rear swing arm 110 enters the concave portion 74a. As a result, the pivot portion 152 is disposed so that the pivot portion 152 partially overlaps the connection portion 74. The through hole 74c is provided in the concave portion 74a. An opening end face of the through hole 74c faces the bottom portion 74a2. If the concave portion 74a is provided in the connection portion 74 in this way, the connection portion 74 can be disposed at a position biased toward the center with respect to the vehicle width direction with a sufficient length of the pivot portion 152 being secured, which is advantageous to secure the space used to insert the fastening tool 170 into the right-side opening 76.

The surrounding wall 74a1 of the concave portion 74a is formed in a shape diverging toward the rear of the vehicle at an angle θ, for example, in a side view. Accordingly, the concave portion 74a serves as a guide which guides the pivot portion 152 located at the front end of the rear swing arm 110 to facilitate positioning of the pivot portion 152 at the through hole 74c. In addition, with the angle θ, the interference with the rear swing arm can be avoided even when the rear swing arm 110 swings in up and down directions. It should be noted that, also in the left-side frame member 71, a through hole 74c similar to the above through hole 74c is coaxially provided (see FIG. 3).

In the connection portion 74, an attachment bracket portion 74e for pivotally supporting the upper end of the rear-wheel suspension 90 is formed, and an attachment hole 74b for attaching the rear-wheel suspension 90 thereto is provided in the attachment bracket portion 74e. More specifically, the connection portion 74 has an inclined face 74d which is continuous with the inclined face of the upper cross member 72, and a left-side edge of the inclined face 74d is continuous with the surrounding wall 74a1 of the concave portion 74a. In a side view, the attachment hole 74b is disposed obliquely above and more rearwardly than the through hole 74c, and obliquely below and more rearwardly than the upper cross member 72. Thus, the attachment hole 74b is formed between the upper cross member 72 and the through hole 74c with respect to the up and down directions. As a result, the upper end of the rear-wheel suspension 90 is positioned below the upper cross member 72, so that the space around the upper end of the rear-wheel suspension 90 can be used. Accordingly, it becomes easy to secure the swing range of the fastening tool 170, and to perform fastening work.

If the rear swing arm 110 guided by the concave portion 74a is disposed in the left-side opening 75, and the rear swing arm 110 is pivotally supported by the connection portion 74 via the pivot shaft 150 in this way, the right-side end portion of the pivot portion 152 located at the front end of the rear swing arm is attached so that the right-side end portion enters the concave portion 74a, and part of the pivot portion 152 and part of the connection portion 74 overlap each other. In this case, the center line L extending along the longitudinal direction of the vehicle body, that is, the center line L of the rear swing-arm bracket 70 with respect to the vehicle width direction exists in a state where the center line L passes through an area where the right-side end portion of the rear swing arm 110 enters and overlaps the concave portion 74a. In addition, the connection portion 74 is disposed at a position biased toward the right-side frame member 71 as a whole. In this way, the single rear swing-arm bracket 70 is constructed.

Next, with reference to FIGS. 5 and 6, a description will be given of the rear swing arm 110 constituting the rear-wheel suspension system.

The rear swing arm 110 includes the front-end pivot portion 152 disposed in the left-side opening 75, an arm portion 111 extending rearward, a cross portion 112, and a shaft housing 141 with a hollow circular section as a shaft drive mechanism 140 which is joined to the cross portion 112, and disposed substantially in parallel with the arm portion 111. In a rear end portion of the shaft housing 141, a flange portion 143 is provided which is to be joined to a gear box in which a gear mechanism constituted of a bevel gear and the like not shown are housed. In the shaft housing 141, in a front end portion thereof, the yoke joint portion 142 (see FIG. 4) of a universal coupling connected to the output shaft of the engine 8 (see FIG. 1) is housed. In a rear end portion thereof, a shaft 144 with a hollow circular section with which the bevel gear not shown is engaged is housed.

The rear wheel 100 is pivotally supported via the axle 31A between the aforementioned gear mechanism disposed on the right side of the rear swing arm 110, and the arm portion 111 disposed on the left side thereof (see FIG. 5).

Thus, with the use of the shaft drive mechanism 140, the engine power is transmitted from the yoke joint portion 142, to the shaft 144, and to the axle 31A via the gear mechanism including the bevel gear and the like not shown, so that the rear wheel is driven, which makes it possible for the vehicle to be operated. As illustrated in FIGS. 5 and 6, an extending portion 113 is provided as a reinforcement member connecting the pivot portion 152 and the cross portion 112.

Figure 9:
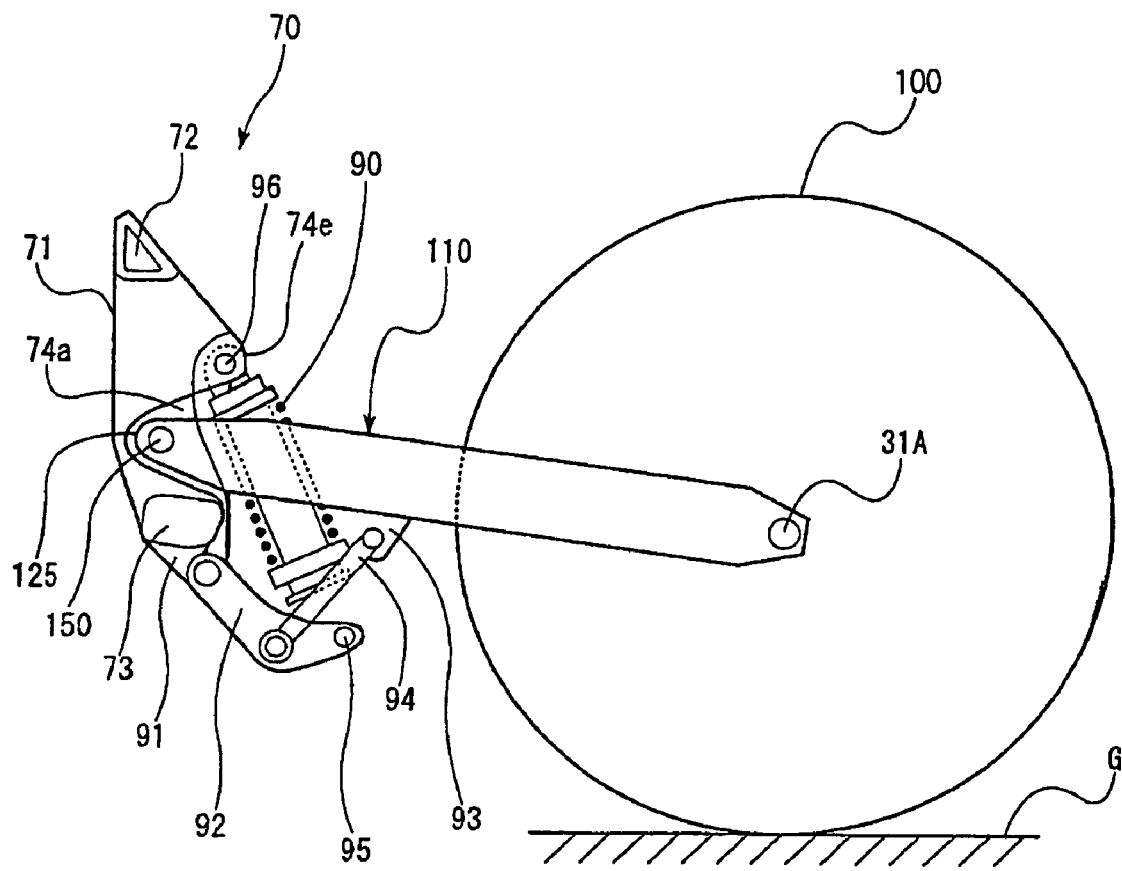
FIG. 9 is a left side view showing a state in which the rear-wheel suspension is mounted.

Next, with reference to FIGS. 5, 6 and 9, a description will be given of the rear-wheel suspension 90 as a damping means which is a component of the rear-wheel suspension system. FIG. 9 is a left side view showing a state in which the rear-wheel suspension is mounted. Brackets 91 are provided in a projecting manner on the lower side of the lower cross member 73. Cushion arms 92 (provided in a pair along the vehicle width direction) are freely pivotally supported by the bracket 91. A pair of connecting rods 94 each include one end of which is freely swingably attached to a substantially middle portion of the cushion arms 92 and a second end that is freely swingably attached to brackets 93 provided in a projecting manner on the lower side the rear swing arm 110. The lower end of the rear-wheel suspension 90 is freely swingably attached to rear end portions of the cushion arms 92 via a pin member 95. On the other hand, the upper end of the rear-wheel suspension 90 is freely swingably attached to the attachment holes 74b drilled in the attachment bracket portion 74e of the connection portion 74 via a pin member 96. As a result, the upper end of the rear-wheel suspension 90 is positioned between the upper cross member 72 and the pivot shaft 150 with respect to the up and down directions of the vehicle. As illustrated in FIG. 9, a road surface G is provided on which the vehicle runs.

Next, a description will be given of an example of the assembling process of the rear-wheel suspension system in an assembly line of a motorcycle according to this embodiment. The rear swing arm 110 is inserted into the rear swing-arm bracket 70 so that the rear swing arm 110 side and the shaft housing 141 side are positioned in the left-side opening 75 and the right-side opening 76, respectively. At this time, the pivot portion 152 of the rear swing arm is guided by virtue of the guiding function of the concave portion 74a formed in the connection portion 74, and is set in a temporarily positioned state. In this state, the yoke joint portion 142 of the shaft drive mechanism 140 is coupled to the output shaft of the engine 8 via a yoke coupling. Subsequently, the pivot shaft 150 is inserted into the through hole 74c of the left-side frame member 71, the pivot portion 152, and the through hole 74c formed in the connection portion 74 for temporary assembly. Thereafter, the nut 160 is temporarily put on the pivot shaft 150 to perform the fastening of the pivot shaft 150 as a bolt. Then, a torque wrench 170 is inserted through the space between the connection portion 74 and the yoke joint portion 142, and the nut 160 is gradually tightened while checking the torque. When a predetermined torque is reached, the assembly of the rear swing arm 110 is completed. Subsequently, when the rear-wheel suspension 90 is mounted between the cushion arms 92 and the attachment bracket portions 74e, the assembly of the rear-wheel suspension system is completed.

With the motorcycle 1 according to this embodiment, since the shaft drive mechanism 140 is disposed at a position biased toward the right-side frame member 71 of the bracket 70, and the connection portion 74 of the rear swing arm 110 is disposed at a position biased toward the center with respect to the vehicle width direction, a working space used to insert the fastening tool 170 between the shaft drive mechanism 140 and the connection portion 74 of the rear swing arm 110 is secured. Accordingly, it is made possible to fasten the rear swing arm 110 with the bolt 150 and the nut 160 into which the bolt 150 is screwed, so that it is possible to eliminate the step of cutting a thread in the bracket 70. In addition, since an extending portion 113 is formed as a reinforcement member connecting the pivot portion 152 and the cross portion 112 as shown in FIG. 5, it is possible to increase the rigidity of the rear swing arm 110 without connecting the pivot portion 152 and the shaft housing 141. For this reason, unlike the prior art, the through hole through which the rear-wheel suspension 90 is passed is not required in the rear swing arm 110. As a result, it is made possible to reduce the number of manufacturing steps and labor, and the workability is improved.

In addition, in this case, the connection portion 74 for the pivot portion 152 of the rear swing arm 110 is provided with the concave portion 74a, so that it is possible to secure a certain length of the pivot shaft 152. More specifically, a side rim of the rear swing arm 110 enters the concave portion 74a by a dimension D, which results in a positional relation such that the side rim of the rear swing arm 110 and the connection portion 74 partly overlap each other (see FIG. 4). For this reason, the connection portion 74 can be disposed at a position biased toward the center with respect to the vehicle width direction with a sufficient length of the pivot portion 152 secured, which is advantageous to secure the space used to insert the fastening tool 170 into the right-side opening 76. In addition, since a sufficient length of the pivot portion 152 can be secured, it is possible to maintain the rigidity of the front end portion of the rear swing arm 110.

The concave portion 74a provided in the connection portion 74 is formed in a shape diverging toward the rear at the angle θ (see FIG. 8). As a result, the concave portion 74a serves as a guide when the rear swing arm 110 is attached to the rear swing-arm bracket 70, so that the efficiency of assembly work can be improved.

Since the positions of the attachment bracket portions 74e provided in the connection portion 74 are set so that the attachment bracket portions 74e are located between the upper cross member 72 and the through hole 74c, it is made possible to mount the rear-wheel suspension 90 bellow the upper cross member 72, so that it is possible to lower the center of gravity of the vehicle. In addition, a space is secured above the rear-wheel suspension 90, and the flexibility of arrangement of the other parts is increased. Accordingly, it is possible to further lower the center of gravity.

Since the attachment bracket portions 74e are disposed so that the attachment bracket portions 74e are located obliquely above and more rearward than the through hole 74c, and obliquely below and more rearward than the upper cross member 72, the working space can be secured above the rear-wheel suspension 90. Thus, it is possible to swing the handle of the fastening tool 170 within the range of the angle A as shown by the chain double-dashed line in FIG. 5. Accordingly, there is an advantage that the tightening of fastenings can be efficiently carried out.

Since the upper cross member 72 is provided so as to extend between the upper portions of the frame members 71 and is formed so that the upper cross member 72 has an inclined face 74d formed in a triangle shape in section (see FIG. 8) inclined downward toward the rear, it is possible to secure an additional space to the rear of the upper cross member.

In addition, according to this embodiment, the rear swing-arm bracket is formed of the left/right pair of frame members, with the upper and lower cross members laterally extending between the frame members, and the connection portion being provided so as to extend between the upper and lower cross members, so that the rigidity of the rear swing-arm bracket can be increased. Thus, it is possible to increase the support rigidity of the rear swing arm freely swingably coupled via the pivot shaft.

While the embodiment of the present invention has been described in detail, the present invention is not limited to the described embodiment. Various alterations in design can be made without departing from the spirit of the invention described in the claims of the present invention.

For example, although the left-side opening 75 is formed larger than the right-side opening 76 in the above-described embodiment, both of the openings may be formed in the same size.

In addition, although the rear swing arm 110 is pivoted via the single pivot shaft 150 in the above-described embodiment, an embodiment may be adopted in which the rear swing arm 110 is pivoted by using separate pivot shafts, that is, bolts and screwing them into the pivot portion 152 from the left and right of the rear swing arm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle having a front end portion of a rear swing arm being pivoted to a rear swing-arm bracket via a pivot shaft with a rear wheel rotatably supported by a rear end portion of the rear swing arm that is driven by a shaft drive mechanism, said rear swing arm being supported by a rear-wheel suspension, comprising:
    left and right frame members forming sides of the rear swing-arm bracket;
    upper and lower cross members extending between upper portions of the frame members and between lower portions thereof, respectively;
    a connection portion extending between the upper and lower cross members, and forming openings in parallel on left and right sides by partitioning;
    a front end portion of a shaft drive mechanism and a front end portion of the rear swing arm facing one opening and the other opening, respectively; and
    a through hole being formed in the connection portion into which the pivot shaft is inserted;
    wherein the connection portion is disposed within an area where the connection portion overlaps a center line of a motorcycle with respect to a motorcycle width direction and is disposed at a position biased toward the frame member forming the opening which a front end portion of the shaft drive mechanism faces, and
    wherein the connection portion is provided with an attachment bracket portion to which an upper end of the rear-wheel suspension is attached.

2. The motorcycle according to claim 1, wherein the connection portion has a concave portion around the through hole at the opening which the front end portion of the rear swing arm faces and part of the front end portion of the rear swing arm is located in the concave portion.

3. The motorcycle according to claim 1, wherein the attachment bracket portion is provided between the upper cross member and the through hole with respect to up and down directions of the vehicle.

4. The motorcycle according to claim 1, wherein the attachment bracket portion is disposed obliquely above and more rearward than the through hole, as well as obliquely below and more rearward than the upper cross member.

5. The motorcycle according to claim 1, wherein the upper cross member extends between the upper portions of the left/right pair of frame members with an inclined face formed in a triangle shape in section inclined downwardly and rearwardly.

6. The motorcycle according to claim 2, wherein the upper cross member extends between the upper portions of the left/right pair of frame members with an inclined face formed in a triangle shape in section inclined downwardly and rearwardly.

7. The motorcycle according to claim 3, wherein the upper cross member extends between the upper portions of the left/right pair of frame members with an inclined face formed in a triangle shape in section inclined downwardly and rearwardly.

8. The motorcycle according to claim 4, wherein the upper cross member extends between the upper portions of the left/right pair of frame members with an inclined face formed in a triangle shape in section inclined downwardly and rearwardly.

9. A rear swing arm for use with a motorcycle comprising:
    a front end portion of the rear swing arm being pivoted to a rear swing-arm bracket via a pivot shaft;
    upper and lower cross members extending between upper portions of left and right frame members of the rear swing arm and between lower portions thereof, respectively;
    a connection portion extending between the upper and lower cross members, and forming first and second openings in parallel on left and right sides;
    a front end portion of a shaft drive mechanism facing the first opening and a front end portion of the rear swing arm facing the second opening; and
    a through hole being formed in the connection portion into which the pivot shaft is inserted;
    wherein the connection portion is disposed within an area where the connection portion overlaps a center line of a motorcycle with respect to a motorcycle width direction and is disposed at a position biased toward the frame member forming the opening which a front end portion of a shaft drive mechanism faces, and
    wherein the connection portion has a concave portion around the through hole at the opening which the front end portion of the rear swing arm faces and part of the front end portion of the rear swing arm is located in the concave portion,
    wherein the concave portion is formed in a shape diverging toward the rear of the vehicle at an angle, whereby interference with the rear swing arm can be avoided when the rear swing arm moves in a vertical direction,
    wherein the front end portion of the rear swing arm and the concave portion are disposed so that they partially overlap each other in the vehicle width direction, the connection portion biased toward the center of the vehicle width direction.

10. The rear swing arm for use with a motorcycle according to claim 9, wherein the connection portion is provided with an attachment bracket portion to which an upper end of the rear-wheel suspension is attached.

11. The rear swing arm for use with a motorcycle according to claim 10, wherein the attachment bracket portion is disposed obliquely above and more rearward than the through hole, as well as obliquely below and more rearward than the upper cross member.

* * * * *